(No Model.)
R. HAMILTON.
CLEVIS.
No. 291,053.  Patented Jan. 1, 1884.
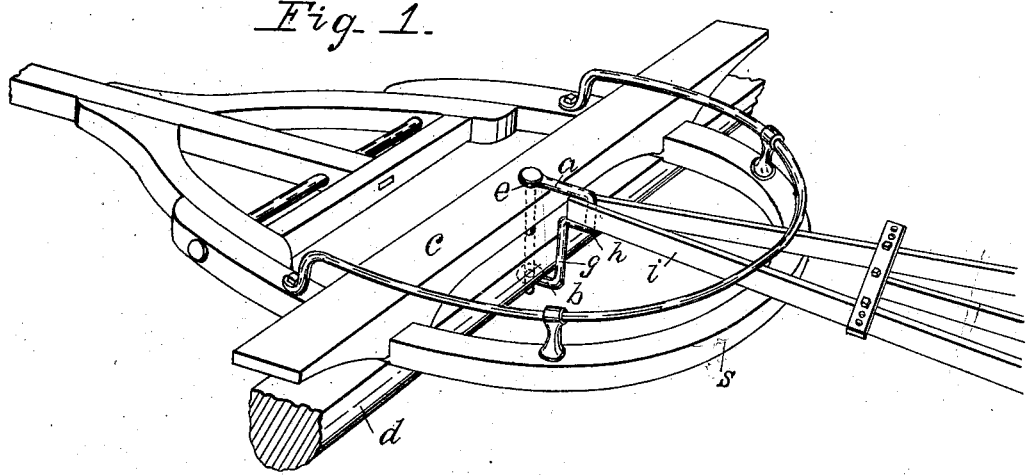
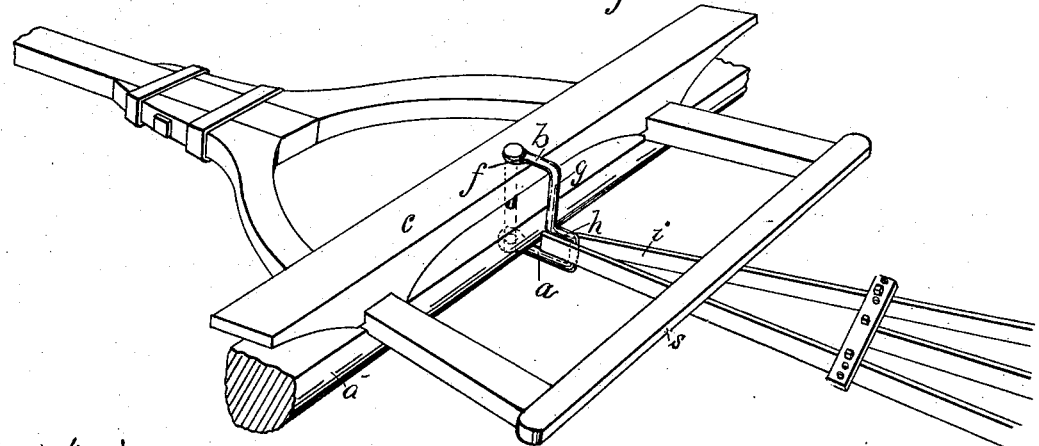
WITNESSES:
E. E. Sickles
A. B. Hall
INVENTOR:
Robert Hamilton
By H. P. Hood,
Atty.

UNITED STATES PATENT OFFICE.

ROBERT HAMILTON, OF FRANKLIN, INDIANA.

CLEVIS.

SPECIFICATION forming part of Letters Patent No. 291,053, dated January 1, 1884.

Application filed October 8, 1883. (No model.)

*To all whom it may concern:*

Be it known that I, ROBERT HAMILTON, a citizen of the United States, residing at Franklin, in the county of Johnson and State of Indiana, have invented a new and useful Improved Clevis, of which the following is a specification.

My invention relates to an improved clevis, particularly adapted for coupling the tongue of a grain-binder truck to the forward axle of an ordinary farm-wagon.

The object of my improvement is to provide a clevis equally well adapted for coupling the binder-truck tongue to a forward axle with a stiff tongue, or a forward axle with a limber tongue, as hereinafter fully explained.

The accompanying drawings illustrate my invention.

Figure 1 shows my clevis applied to a clevis with a limber tongue. Fig. 2 shows my clevis applied to an axle with a stiff tongue. Fig. 3 is a view of the clevis detached.

The clevis is formed with arms $a\ b$, placed a sufficient distance apart to embrace between them the sand-bar $c$ and axle $d$ of an ordinary farm-wagon. Said arms are provided at one end with eyes $e$ and $f$, which are adapted to receive the king-bolt of the wagon. Arm $a$ is made longer than arm $b$, and the two are joined by a bar, $g$, having an offset portion, $h$, the whole being formed, preferably, of a round bar of iron bent in the form shown. Offset $h$ is of sufficient width to receive easily and to support on both sides the tongue $i$ of a two-wheeled truck for moving grain-binders and for like purposes.

In coupling such a tongue to an axle with a limber tongue, as in Fig. 1, it is necessary that the tongue $i$ of the truck pass above the slide-bar $s$, to keep the hounds from turning downward, and my clevis is applied with the offset $h$ at the top, thereby sustaining the tongue $i$ easily just clear of the slide-bar.

In coupling to an axle with a stiff tongue, as in Fig. 2, it is desirable to have the tongue $i$ pass beneath the slide-bar, and my clevis is reversed and applied with the offset $h$ at the bottom, as shown in Fig. 2.

By the use of this clevis the wagon tongue and axle are not cramped in their movements by the tongue of the binder-truck, and breakage of the latter is avoided.

I claim as my invention—

1. A clevis for the purpose specified, having arms of unequal length connected by an offset-bar adapted to receive and support a truck-tongue, and said arms provided with eyes to receive a king-bolt, all substantially as shown and described.

2. The combination, with the forward axle of a wagon and the sand-bar thereon, and the tongue of a truck, of a clevis adapted to embrace between its arms said axle and sand-bar, and to receive a king-bolt, and having the offset $h$, for the purpose specified.

ROBERT HAMILTON.

Witnesses:
H. P. HOOD,
E. E. SICKLER.